FIG. I

INVENTORS
ROBERT S. MUELLER
I. MACIT GUROL
MARTIN W. UITVLUGT
BY Hoffmann and Yount
ATTORNEYS Jan. 17, 1967 R. S. MUELLER ETAL 3,298,482
SPEED GOVERNOR
Filed May 6, 1965 7 Sheets-Sheet 2

INVENTORS
ROBERT S. MUELLER
I. MACIT GUROL
MARTIN W. UITVLUGT
BY Hoffmann and Yount
ATTORNEYS INVENTORS
ROBERT S. MUELLER
I. MACIT GUROL
MARTIN W. UITVLUGT
BY Hoffmann and Yount
ATTORNEYS Jan. 17, 1967   R. S. MUELLER ETAL   3,298,482
SPEED GOVERNOR Filed May 6, 1965   7 Sheets-Sheet 4

INVENTORS
ROBERT S. MUELLER
I. MACIT GUROL
MARTIN W. UITVLUGT
BY *Hoffmann and Yount*
ATTORNEYS INVENTORS
ROBERT S. MUELLER
I. MACIT GUROL
MARTIN W. UITVLUGT
BY Hoffmann and Yount
ATTORNEYS

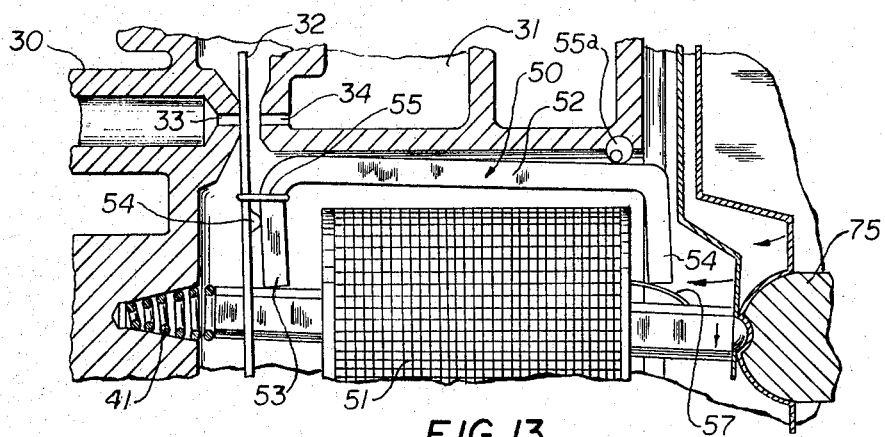
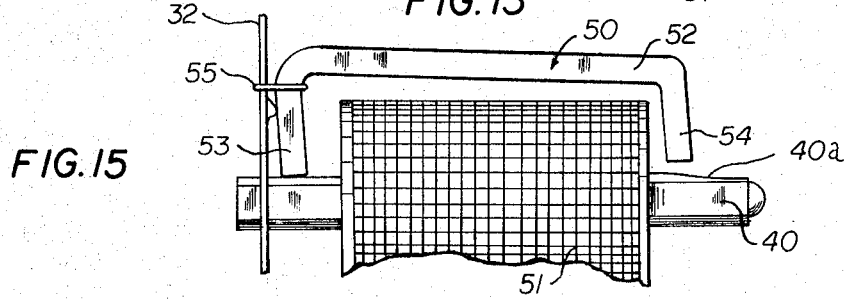
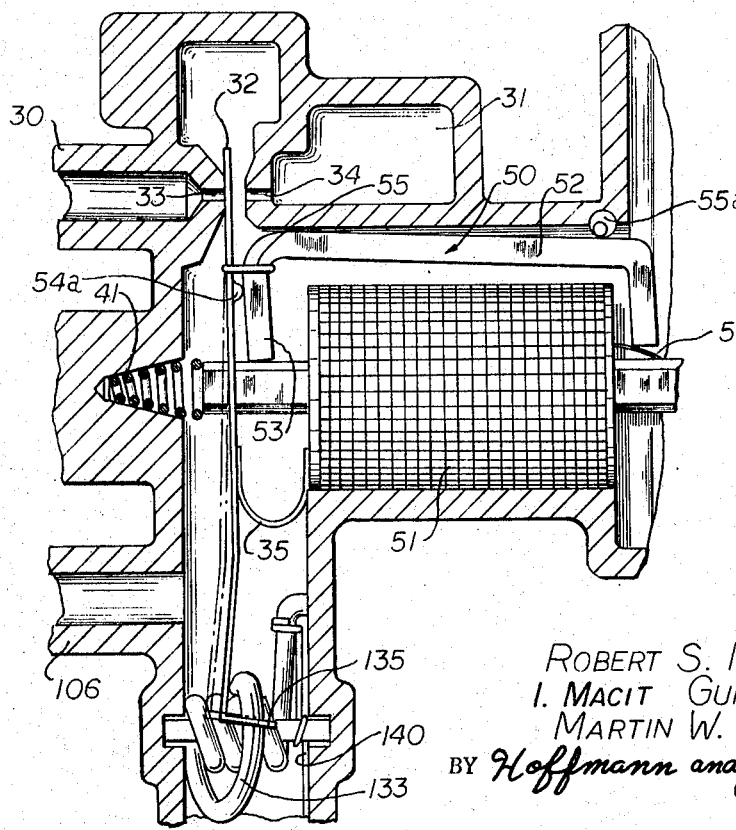

3,298,482
Patented Jan. 17, 1967

3,298,482
SPEED GOVERNOR
Robert S. Mueller, Oak Park, I. Macit Gurol, Farmington, and Martin W. Uitvlugt, Battle Creek, Mich., assignors to Eaton Yale & Towne Inc., a corporation of Ohio
Filed May 6, 1965, Ser. No. 453,750
62 Claims. (Cl. 192—3)

The present invention relates to a mechanism for positioning a control member for controlling a specific condition and, in particular, relates to a speed governor mechanism for positioning a throttle control member of an automotive vehicle for controlling the speed of the vehicle.

The desirability of speed governor mechanisms for use in vehicles is well recognized. In general, speed governors operate to position the throttle member of a vehicle to maintain a selected vehicle speed without requiring the operator of the vehicle to keep his foot on the accelerator pedal. Furthermore, certain speed governors permit overriding of the control mechanism upon depression of the accelerator pedal for passing and effect return of the vehicle to the selected speed when the operator's foot is removed from the accelerator. Also speed governor mechanisms are rendered inoperative upon depression of the brake pedal of the vehicle and may be again rendered operative to maintain the selected speed. Moreover, it is extremely desirable for a speed governor to operate to provide a control signal to the vehicle operator when the vehicle is driven at a speed in excess of a preset or selected speed.

Accordingly, the principal object of the present invention is the provision of a new and improved speed governor mechanism constructed so as to perform all of the above-noted functions and which is reliable in operation, durable, and quickly responds to a decrease in vehicle speed.

A still further object of the present invention is the provision of a new and improved speed governor mechanism capable of being adjusted from one selected speed to another higher speed to maintain the vehicle at the higher speed while the vehicle is in motion and is not at the new speed.

Another object of the present invention is the provision of a new and improved speed governor mechanism of the vacuum type which utilizes a difference in pressure on the opposite sides of an actuating member to effect movement of the actuating member which, in turn, effects positioning of the vehicle throttle member and which is extremely rapid in operation and capable of providing movement to the actuating member extremely quickly in response to a decrease in speed of the vehicle.

A more specific object of the present invention is the provision of a new and improved speed governor of the vacuum type having a member which is moved in response to changes in vehicle speed and which member is capable of being locked to a valve member which controls the vacuum in a vacuum chamber and which locking is effected when the vehicle is at the particular speed which is to be maintained and movement of the member when the speed of the vehicle decreases from the particular speed effects movement of the valve member so as to provide a vacuum in the vacuum chamber to provide a control operation.

A further object of the present invention is the provision of a new and improved vacuum speed governor, as noted in the next preceding paragraph, wherein the member which is moved in response to speed changes is locked to the valve member by a suitable electrical locking coil and linkage mechanism.

A still further object of the present invention is the provision of a new and improved vacuum speed governor, as noted in the next preceding paragraph, wherein the locking coil may be energized and de-energized, respectively, to vary the relative positions of the valve member and the member movable in response to speed changes and thereby varying the speed at which the vehicle will be maintained by the speed governor.

Yet a further object of the present invention is the provision of a new and improved speed governor of the vacuum type which is quick in operation and wherein a feedback mechanism is provided for moving the valve member for controlling the vacuum toward a closed position while the diaphragm member moves in a throttle opening direction, thus permitting greater initial communication between the vacuum chamber and vacuum conduit than is necessary to maintain the vehicle at the desired speed, thereby rendering the speed governor quick acting.

Another object of the present invention is the provision of a new and improved vacuum speed governor, as noted in the next preceding paragraph, wherein the feedback mechanism includes an arm member which is movable with the diaphragm member and is connected to the valve member to effect movement of the valve member upon movement of the diaphragm member.

Still another object of the present invention is the provision of a new and improved speed governor mechanism constructed and arranged so as to provide a vibratory signal on the accelerator pedal of the vehicle when the accelerator pedal is depressed to actuate the vehicle above a predetermined speed, which signal is caused by energization of a solenoid coil which coil moves in opposition to the movement of a linkage connected with the accelerator pedal when being depressed.

Further objects and advantages of the present invention will be apparent to those skilled in the art to which it relates from the following detailed description of the preferred embodiment thereof made with reference to the accompanying drawings forming a part of this specification and in which:

FIGS. 10 to 14 are fragmentary sectional views of portions of the speed governor mechanism of FIG. 1 showing different positions of parts thereof;

FIG. 15 is a fragmentary sectional view of the speed governor mechanism similar to FIG. 1 but of a modified construction.

The present invention provides a control mechanism for positioning a control member for controlling a specific condition in response to sensing of the condition. In particular, the present invention provides a speed governor mechanism for controlling the position of a throttle control member of an automotive vehicle which controls the speed of the vehicle. The position of the throttle control member is controlled by the speed governor mechanism in response to sensing of the speed of the vehicle. As representing the preferred embodiment of the present invention, a speed governor mechanism is illustrated in FIG. 1.

Figure 1:
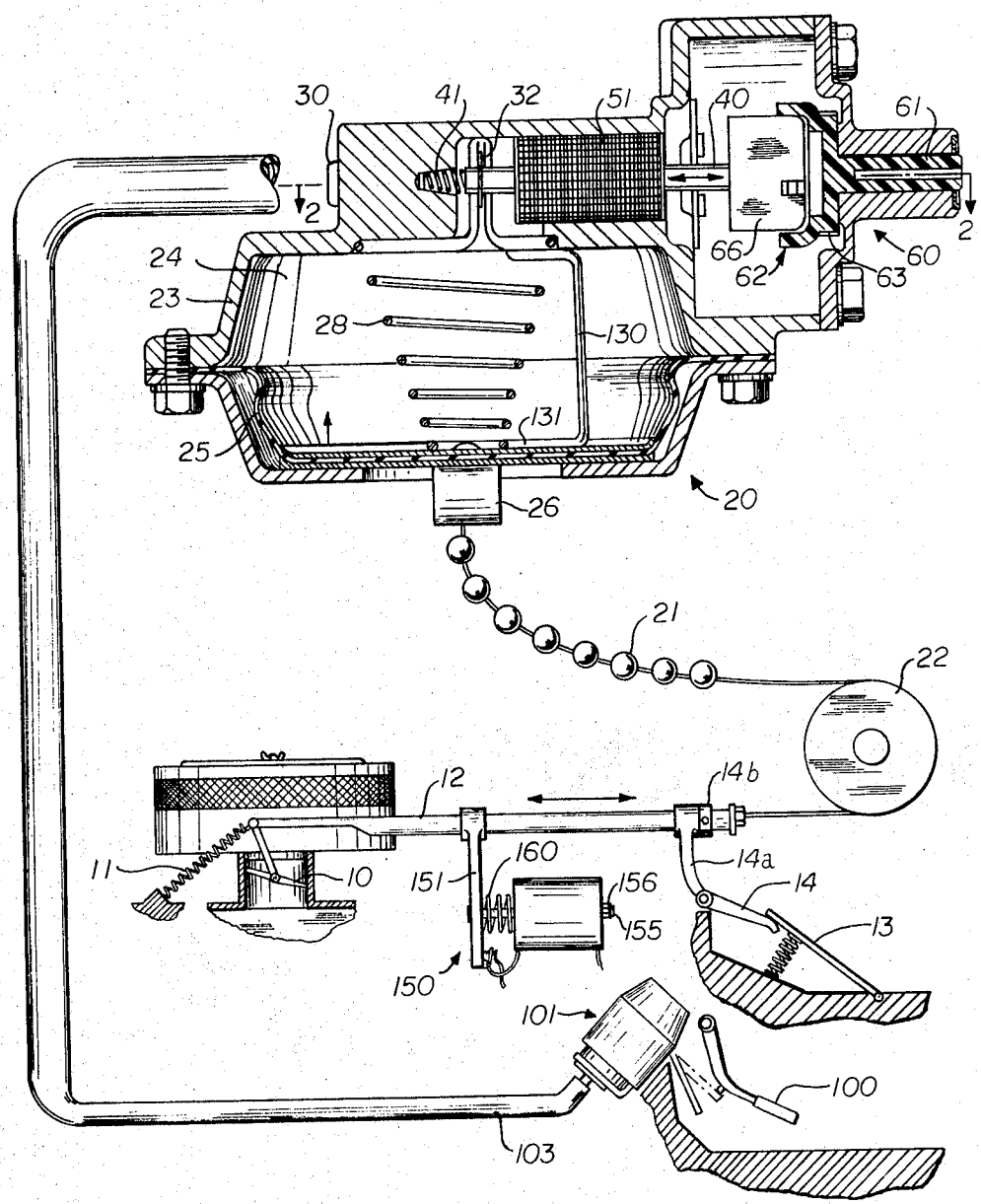
FIG. 1 is a schematic view illustrating a speed governor mechanism embodying the present invention.

The speed governor mechanism of FIG. 1 is utilized for controlling the position of a throttle control member 10 of the automotive vehicle in which the speed governor mechanism is utilized. The throttle control member 10 is movable from a closed position, illustrated in FIG. 1, to a fully open position in a throttle opening direction for increasing the vehicle speed and is moved in the reverse direction to a closed position for decreasing vehicle speed. The throttle member 10 is biased to its closed position by a spring member 11, one end of which engages a suitable fixed support member and the other end of which engages one end of a rod 12 which is connected to the throttle member 10. The rod 12 is connected to the throttle member 10 so as to effect movement of the throttle member 10 between its positions upon linear movement thereof. As viewed in FIG. 1, when the rod 12 moves to the right, the throttle member 10 moves in its throttle opening direction and when the rod member 12 moves to the left, the throttle member 10 moves in a throttle closing direction.

The rod 12 is, as noted above, biased by the spring member 11 to the left and is moved to the right by depression of the accelerator pedal 13 of the automotive vehicle. As the accelerator pedal 13 is depressed, the spring 11 applies a greater force tending to bias the rod 12 against movement by the accelerator pedal. The accelerator pedal 13, when depressed by the operator's foot, actuates a bell crank link member 14 in the embodiment shown in FIG. 1, and effects movement of the arm 14a thereof, which forms a part of the link 14, toward the right. The arm 14a is slidably mounted on the rod 12 and engages a collar 14b thereon to effect movement of the rod 12 toward the right when the arm moves toward the right, thereby effecting movement of the throttle member 10 in a throttle opening direction.

The throttle 10 also may be moved in its throttle opening direction by means of a speed governor unit 20 which is operatively connected to the rod 12 by means of a flexible chainlike member 21. The chain member 21 is trained around suitable pulleys, such as 22, to effect movement of the rod 12 upon actuation of the speed governor unit 20. The speed governor unit 20 is of the so-called vacuum type and includes a housing 23 which defines in part a vacuum chamber 24, and supports a flexible diaphragm 25 which forms a wall of the vacuum chamber 24. The diaphragm 25 is connected by means of a suitable clip 26 to the end of the chain member 21 opposite the end connected with the rod 12. Movement of the flexible diaphragm 25 in the direction of the arrow, shown in FIG. 1, is in the direction to effect movement of the rod 12 toward the right, as viewed in FIG. 1, through the chain connection 21 and movement of the throttle member in its throttle opening direction.

The diaphragm 25 is moved in the direction of the arrow shown in FIG. 1 in response to the creation of a vacuum in the vacuum chamber 24 and is biased to its position shown in FIG. 1 by means of a suitable spring 28 and spring 11. When the vacuum in the chamber 24 and the force applied by springs 11 and 28 balance the diaphragm stops moving and is in an equilibrium condition. If the vacuum is then either increased or decreased, the diaphragm will move. If the vehicle speed decreases, as when the vehicle goes up a hill, the vacuum will increase to move the diaphragm to increase the throttle opening. If the vehicle speed increases, as when the vehicle goes down a hill, the vacuum will decrease and the diaphragm will move so that the spring 11 will decrease the throttle opening.

The vacuum in the vacuum chamber 24 is provided through a suitable vacuum connection 30 in the housing 23 which is connected by suitable conduits, not shown, to the intake manifold of the vehicle to apply a vacuum thereat. The chamber 24 also communicates with the atmosphere through a suitable connection 31 preferably spaced slightly from the connection 30 and opposite thereto.

The vacuum in the chamber 24 is controlled by a valve member or flapper member 32, the operation of which will be described in detail hereinbelow but which, in general, controls the amount of communication between the vacuum connection 30 and atmosphere connection 31 and the chamber 24. The valve or flapper member 32 is an elongated member which extends between nozzle-like openings 33, 34 connecting the vacuum and atmospheric connections 30, 31 with the chamber 24. The flapper member 32 is movable relative to the nozzle openings 33, 34 and when positioned adjacent to the nozzle opening 33, substantially blocks communication between the vacuum conduit 30 and the vacuum chamber 24, and the chamber 24 thus is at substantially atmospheric pressure and the diaphragm member 25 is in the position shown in FIG. 1. When the flapper member 32 moves away from the nozzle 33, the vacuum connection 30 then communicates with the chamber 24 and a vacuum is established therein causing the diaphragm member 25 to move in its throttle opening direction to effect opening movement of the throttle member 10. The flapper member 32 specifically is a flat strip member which extends between the adjacent nozzles 33 and 34, respectively, and is biased by a suitable leaf spring 35 into engagement with the nozzle 33, thereby blocking communication between the vacuum connection 30 and the chamber 24.

Figure 2:
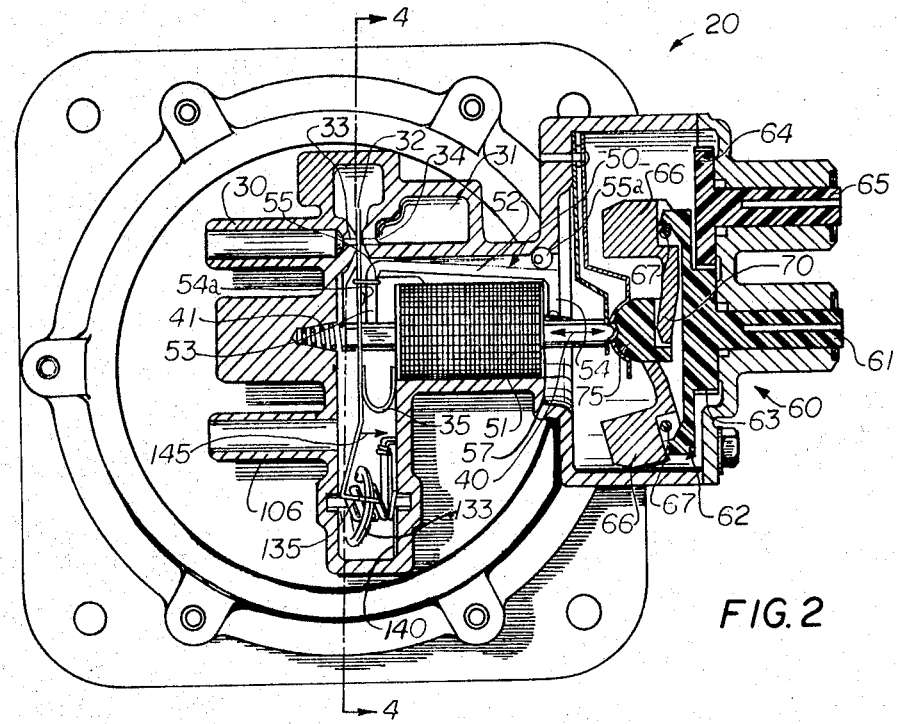
FIG. 2 is a sectional view of a portion of the speed governor mechanism shown in FIG. 1, taken approximately along the section line 2—2 of FIG. 1.
Figure 3:
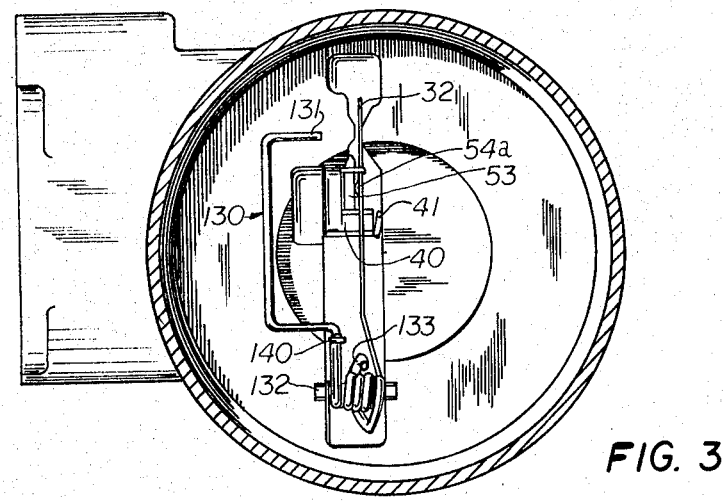
FIG. 3 is a sectional view of a portion of the speed governor mechanism shown in FIG. 4, taken approximately along the section line 3—3 of FIG. 4.
Figure 4:
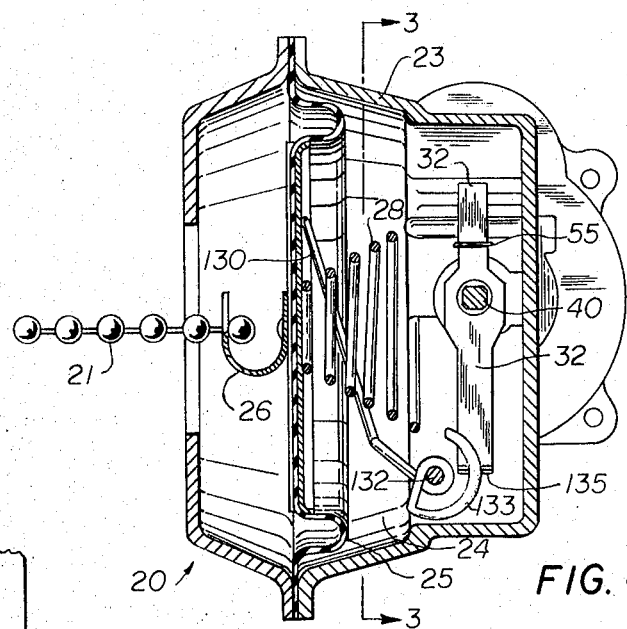
FIG. 4 is a sectional view of the speed governor mechanism shown in FIG. 2, taken approximately along the section line 4—4 of FIG. 2.

The flapper member 32 is moved to the right, as viewed in FIG. 2, when the speed governor unit 20 is actuated in response to a decrease in vehicle speed. When this occurs, a vacuum is established in the chamber 24 in accordance with the amount of movement of the flapper member. This causes movement of the diaphragm member 25 in its throttle opening direction to hold the vehicle speed near the desired speed. The movement of the flapper member 32 is effected in response to movement of a core member 40, which moves right and left, as viewed in FIG. 2, in response to changes in vehicle speed. The core member 40 moves to the left, as viewed in FIG. 2, upon an increase in vehicle speed, and moves to the right, as viewed in FIG. 2, upon a decrease in vehicle speed, as will be described in detail hereinbelow. The left end of the core member, as viewed in FIG. 2, extends through an opening in the flapper member 32 and supports the flapper member and is slidable in the opening relative to the flapper member. A suitable spring member 41 is supported in the housing 23 and engages the left end of the core member 40, as viewed in FIG. 2, and biases the core member 40 to the right.

The speed governor unit 20 includes a locking mechanism 50 for locking the core member 40 to the flapper member 32 to cause these members to move together so that when the core member moves in response to vehicle speed, the flapper member 32 likewise moves. The locking mechanism 50 includes an electrical coil 51, positioned encircling the core member 40. A suitable locking bracket member or link member 52 straddles the coil member 51 and is engageable with the core member 40 on the opposite axial ends of the coil member 51. The link member 52 is U-shaped and the legs 53 and 54 of the link member 52 are positioned at the opposite ends of the core member 51 and the extreme ends of the legs 53, 54 engage the core member 40 when the coil 51 is energized.

Figure 6:
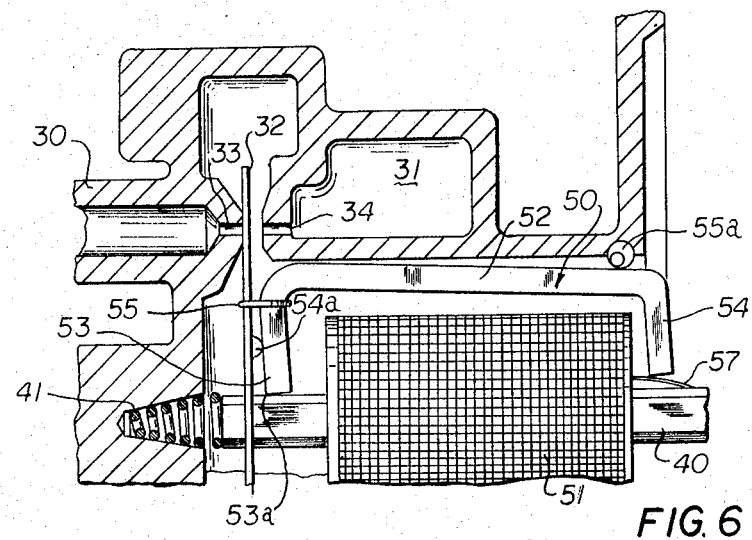
FIGS. 6 and 7 are fragmentary sectional views of a portion of the speed governor mechanism shown in FIG. 1, showing parts of the speed governor mechanism in different operative positions.

The leg 53 of the link 52 intermediate its ends engages a fulcrum lug 54a formed on the flapper member 32 and a flexible connection in the form of a flexible band member 55 encircles the flapper 32 and the leg 53 and biases the link 52 upwardly relative to the coil 51 and into the position, best shown in exaggerated form in FIG. 6. The upper position of the link 52 is provided by an adjustable eccentric stop 55a which engages the link 52 and limits its upward movement.

Figure 7:
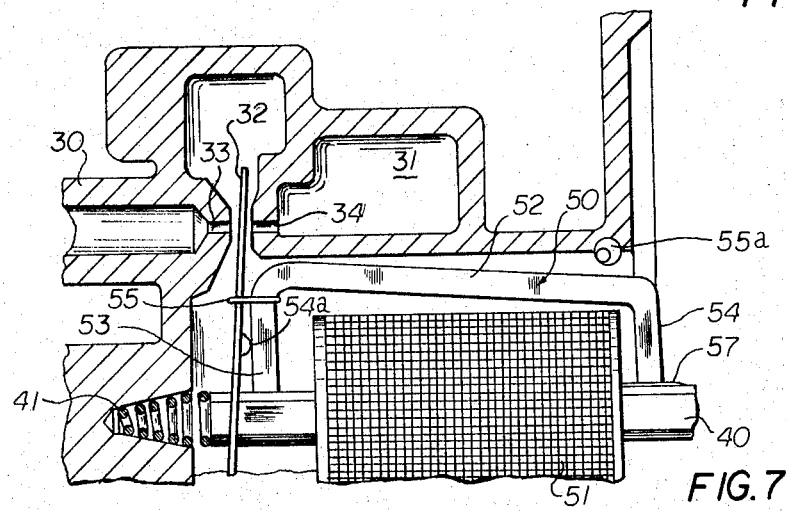

In order to lock the core member 40 to the flapper member 32, the coil 51 is energized causing movement of the link 52 by magnetic attraction downwardly into the position shown in FIG. 7. Because of the construction and arrangement of the flapper member 32, core 40, and link 52, when the coil 51 is energized, the portion 53a of the leg portion 53 of the link 52 first locks to the core member 40 and becomes a temporary fulcrum for the link 52 and the flapper member 32 and the link 52 pivot as a unit. The flapper member 32 due to the pivoting movement moves from contact with the nozzle 33, and, as will be described in great detail hereinbelow, moves to a position located a distance from the nozzle 33 to have the appropriate vacuum applied in the chamber to hold the throttle member at the desired speed.

The link 52 also pivots about the fulcrum 54a formed on the flapper member 32 and locks the core 40 to the flapper 32. Thus, with the core member 40 locked through the energization of the coil 51 with the flapper 32 upon a decrease in vehicle speed, the flapper will move to the right, as viewed in FIG. 2, with the core member 40. This causes movement of the flapper 32 from its position in a direction away from the vacuum nozzle 33 and effects greater communication of the vacuum nozzle 33 with the vacuum chamber 24 and effects the creation of a greater vacuum in the chamber 24 and movement of the diaphragm 25 in its throttle opening direction.

When the coil 51 is de-energized, the flexible band 55 tends to return the link 52 to the position illustrated in FIG. 6. A suitable leaf spring 57, shim, or spacing means is preferably provided on the core and engages the leg 54 of the link 52 to assist in moving the link 52 from the position shown in FIG. 7 to the position shown in FIG. 6. The spring 57, however, does not interfere with the locking of the link 52 to the core 40.

As noted above, the vacuum in the vacuum chamber 24 is controlled, when the electrical coil 51 is energized, by movement of the flapper 32 relative to the vacuum nozzle 33 upon movement of the core member 40. The core member 40 is moved in response to increases and decreases in speed of the vehicle by means of a vehicle speed sensing mechanism, generally designated 60. The mechanism 60 senses the speed of the vehicle and effects movement of the core member 40 in response to changes in the speed. The mechanism 60 includes a suitable drive connection 61 that can be connected with the transmission or front wheel of the vehicle and is driven at a speed in proportion to the speed of the vehicle. The connection 61 is a projection of a drive carriage 62 which has a gear portion 63. The gear portion 63 thereof meshes with a gear 64 having a shaft portion 65 connected thereto and which shaft portion is adapted to be connected with the speedometer of the automotive vehicle.

The carriage 62 carries a plurality of weight members 66 which are pivotally supported on the carriage 62 by means of suitable pins 67 which extend through the weights and through suitable projecting portions of the carriage 62. The weights 66 have arm portions 70 which extend toward the axis of rotation of the carriage 62 and into notches in a suitable drive coupling 75, best shown in FIG. 5. The drive coupling 75 is rotated by the arm portions 70 of the weights upon rotation of the weights and is movable axially upon movement of the arm portions 70 of the weight member 66 axially. The arm portions 70 of the weight member 66 move axially due to centrifugal force upon changes in the speed of rotation of the carriage 62 which occurs when vehicle speed varies. The forward portion of the drive coupling 75 has a semispherical shape and a concave spherical recess 76 is formed therein and is centrally located on the axis of rotation of the drive coupling.

A drive coupling spring retainer 80 engages the forward end of the drive coupling 75 and biases the drive coupling 75 into engagement with the arms of the weights 70. The spring retainer 80 is an elongated spring member having a portion 81 which encompasses the spherical face of the drive coupling 75, but yet permits rotation of the drive coupling relative to the spring retainer, and has a portion 82 which is received in the dimple or concave recess 76 formed in the forward end of the drive coupling 75. The end of the core member 40 opposite the end adjacent the flapper 32 extends adjacent to the drive coupling 75 and through an opening in a suitable core retainer 90 which engages and supports the core member. The core member 40 has a spherical end portion 91 received in the recess portion 82 of the spring retainer 80.

The particular strength of the spring member 80 is such as to bias the drive coupling 75 to the right, as viewed in FIG. 5, if the speed of the vehicle is below a predetermined amount, such as 20 m.p.h., for example. In this case, the end 91 of the core member would not engage the spring retainer 80, but rather would be supported on the left by the core retainer 90 only.

Figure 5:
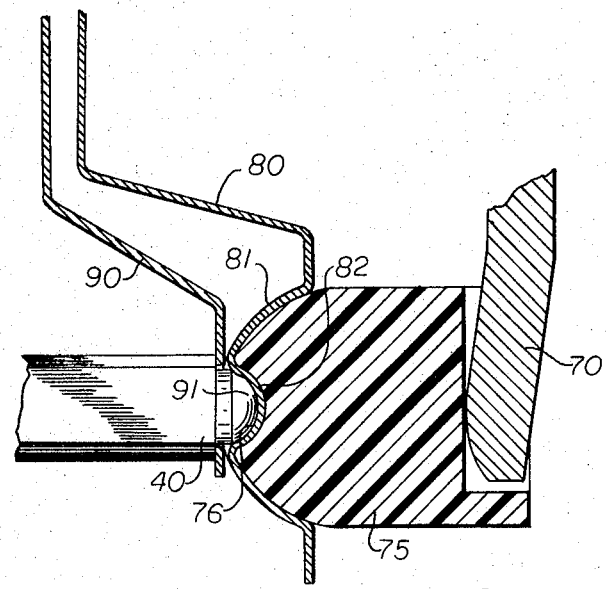
FIG. 5 is a fragmentary view on an enlarged scale of a portion of the speed governor mechanism shown in FIG. 2.

The spring 80 and the end 91 of the core member 40 are placed in circuit with the coil 110, and when these parts are in the position shown in FIG. 5, a circuit can be completed through the spring 80, and core 40 to energize the coil 110 and effect engaging of the governor. However, if these parts are separated, as occurs when the vehicle is below a predetermined speed, a circuit cannot be completed through the spring 80 and core member to energize the coil 110 and, therefore, the coil 110 cannot be energized. Thus, the speed governor unit 20 is incapable of being operable below a predetermined speed, namely, the speed at which the spring 80 biases the drive coupling 75 away from the core 40. Therefore, these parts comprise a means for preventing operation of the governor at low speeds.

From the above description, it should be apparent that the speed governor unit 20 is capable of controlling the position of the throttle control member 10 of the automotive vehicle, and this control is effected in response to sensing the speed of the vehicle, due to the operation of the sensing means. The speed governor is rendered operative at a speed by energizing the coil 51 which locks the core 40 to the flapper 32 through the operation of the link member 52 when the vehicle is above the minimum speed such that the core 40 and spring retainer 80 are in engagement. When the coil 51 is energized, the flapper 32 moves away from the vacuum nozzle to a position intermediate the vacuum and atmosphere connections, and a vacuum is applied in the vacuum chamber, to effect movement of the diaphragm member to a position to maintain the vehicle at the desired speed. After the core member 40 and the flapper 32 are locked together, the core and flapper move together upon a decrease in speed, and the flapper 32 moves with the core 40 and further away from the vacuum nozzle to the right, as viewed in FIG. 2, to provide greater communication between the vacuum connection 30 and the vacuum chamber 24. This results in movement of the diaphragm member upwardly, as viewed in FIG. 1, and thereby effects opening movement of the throttle control member 10, as discussed hereinabove. Should the speed of the vehicle increase above the desired or locked-in-speed, the core 40 moves to the left, as viewed in FIG. 1, and the flapper 32 moves toward the nozzle 33, thereby reducing the vacuum in the chamber. When the vacuum in the chamber 24 is no longer sufficient to overcome the combined force of springs 28 and 11, the diaphragm is returned to its position shown in FIG. 1. At this time, the vehicle throttle is back to its closed throttle position. The core 40 moves to the left, as viewed in FIG. 2 and relative to the flapper 32 which contacts the nozzle 33 and remains stationary during overrunning of the governor.

The speed governor mechanism shown in FIG. 1 is constructed so as to be inoperative to control the speed of the vehicle when the brake pedal 100 of the vehicle is actuated. In general, the construction is such that when the brake pedal 100 is actuated, the vacuum chamber 24 is immediately vented to the atmosphere, thereby breaking the vacuum in the chamber 24 and rendering the speed governor inoperative to perform any control on the throttle 10. The brake pedal 100 is operatively associated with a siutable control mechanism 101 located adjacent thereto and which includes a lever member 102. The lever member 102 is moved between the full and dotted position shown in FIG. 1 and controls the communication of a conduit 103 with the atmosphere. The other end of the conduit 103 communicates with the chamber 24 through a suitable connection 106.

Figure 8:
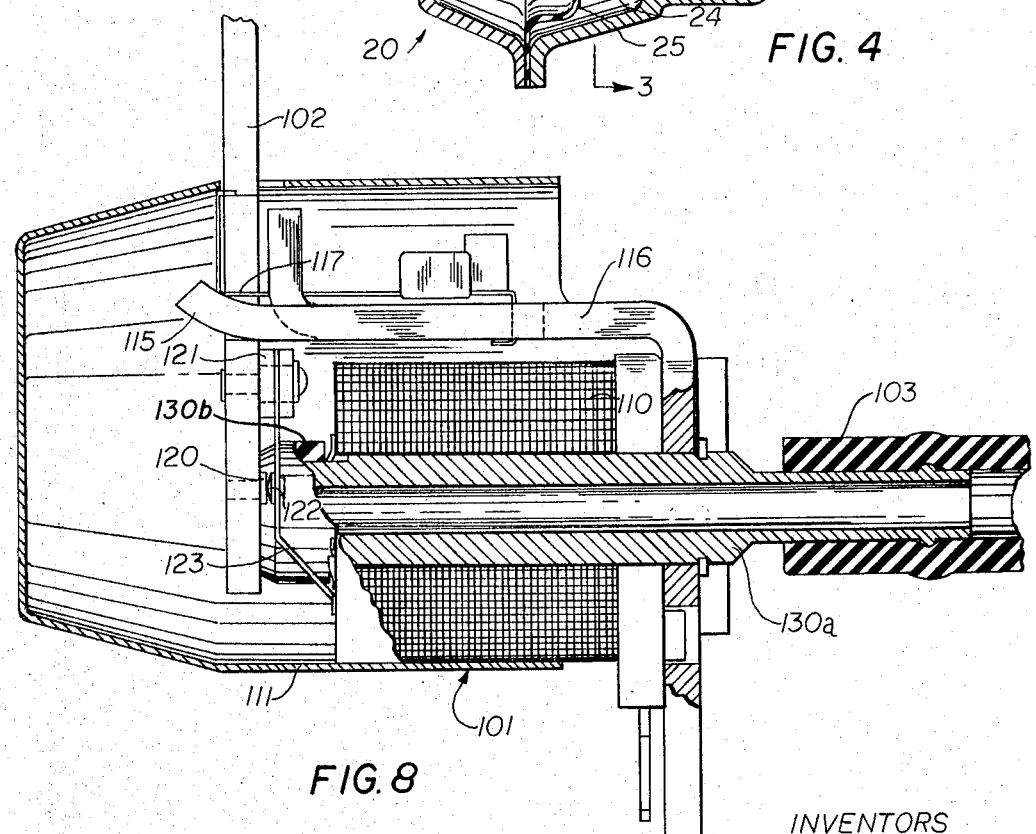
FIG. 8 is a sectional view of a portion of the speed governor mechanism shown in FIG. 1 with parts in elevation and parts in section.

When the control member 102 is in the position shown in full lines in FIG. 1, the conduit 103 is in communication with the atmosphere and no vacuum can be created in the vacuum chamber 24. However, when the control member 102 is moved to its dot-dash position shown in FIG. 1, suitable vacuum can be created in the vacuum chamber 24 due to the fact that the member 102 effects a seal of the conduit 103 from the atmosphere. This structure is best shown in FIG. 8. As illustrated in FIG. 8, the member 102 is in its position in sealing engagement blocking the conduit 103 from communication with the atmosphere.

The member 102 is moved from its full-line position shown in FIG. 1 to its full-line position shown in FIG. 8 upon actuation of a solenoid coil 110, which is carried by a suitable support 111 forming a portion of the mechanism 101. The solenoid coil 110 is supported adjacent to the brake pedal 100. Upon energization of the coil 110, the lever member or conntrol member 102 is moved from its full-line position shown in FIG. 1 to its full-line position shown in FIG. 8. The movement of the control member 102 is guided by a guide portion 115 of the brake housing member 116 which supports the coil member 110. The guide portion 115 extends through an opening 117 in the control member 102 and is curved upwardly so as to guide the movement of the control member 102.

The lower portion of the control member 102 carries an electrical contact 120 and a suitable stop 121. A co-operating electrical contact 122 is carried on a contact blade 123 supported adjacent to the armature. The control member 102, when moved downwardly, engages a seal member 130b carried by a conduit section 130a which extends through the coil 110 and connects with the conduit 103. Moreover, when the control member moves into sealing engagement with the seal 130b, the contacts 120 and 122 engage, thereby completing a circuit therethrough. The contacts 120 and 122 function as a holding circuit for holding the coil 110 energized to hold the control member 102 in sealing engagement with the seal member 130b. Of course, as noted above, upon actuation of the brake pedal 100 of the automotive vehicle, the control member 102 moves away from the seal 130b and causes immediate communication between the conduit 103 and the atmosphere and also simultaneously breaks the holding circuit completed by the contacts 120 and 122, thereby effecting de-energization of the solenoid coil 110. This, of course, renders the speed governor unit ineffective to maintain vehicle speed. It should be understood that the control mechanism 101 could be mounted adjacent the unit 20 with electrical circuitry operated by actuation of the brake pedal to control the movement of the lever member 102, as described above.

In view of the volume of air in the conduit 103 and chamber 24 which must be evacuated in order to obtain movement of the diaphragm member 25 and in order to achieve accurate positioning of the diaphragm member 25 to its position corresponding to the desired speed, the speed governor unit 20 is constructed so as to effect rapid operation and quick movement of the diaphragm member 25 and is constructed so that the flapper member 32 moves an amount greater than that which is necessary to effect movement of the diaphragm member to its position to maintain the vehicle at the desired speed.

To perform this operation, the speed governor unit 20 includes a feedback mechanism for positioning the flapper 32 in accordance with the position of the diaphragm 25. The feedback mechanism which is connected between the diaphragm 25 and the flapper 32 includes a means for moving the flapper 32 toward the vacuum nozzle 33 as the diaphragm member 25 moves in its throttle opening direction independent of the sensing means which moves the core 40. This mechanism includes a suitable lever member formed of a length of wirelike material and designated 130 in the drawings. The member 130 has one end 131 thereof riding on the diaphragm member 25 and the other end thereof is coiled about a pin member 132 and is pivotal about the pin member 132. The end of the member 130 which is wound about the pin member 132 has a cam portion 133 which extends through an opening in a portion 135 of the flapper member 32.

A suitable spring member 140 encircles a portion of the member 130 and bears against the housing of the speed governor unit and biases the end 131 of the member 130 against the diaphragm member. When the diaphragm member moves in its throttle opening direction, the member 130 moves and pivots about the pin member 132, and the cam portion 133 of the member 130 moves through the opening in the flapper member 32 and effects movement of the lower portion of the flapper in the direction of the arrow 145 in FIG. 2. The upper portion of the flapper member 32, as viewed in the drawings, however, moves toward the vacuum nozzle 33 due to the action of the fulcrum 54a. This, of course, causes movement of the flapper 32 toward the vacuum nozzle 33 independently of the sensing means through the fulcrum 54a.

Figure 10:
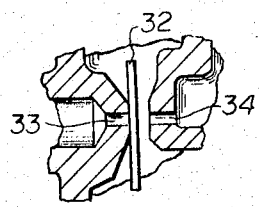
Figure 11:
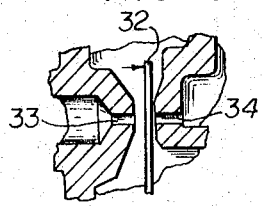
Figure 12:
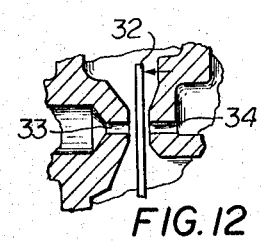

Referring now to FIGS. 10 through 12, the movement of the flapper member and core member 40 of the speed governor should be clear. Prior to energization of the locking coil 51, the flapper member 32 of the speed governor unit is in engagement with the nozzle 33 and the vacuum chamber 24 is in communication with the atmosphere through the nozzle 34. Upon energization of the locking coil 51, the flapper member is pivoted, as described hereinabove, and is moved away from the vacuum nozzle 33 to a position, such as that shown in FIG. 11, wherein it is located between the vacuum nozzle and the connection to the atmosphere. When in this position, a vacuum is applied to the chamber 24 and the diaphragm member 25 begins to move in a speed increasing direction. As the diaphragm member 25 moves in a speed increasing direction due to the operation of the feedback mechanism, the flapper member 32 moves toward the vacuum nozzle 33 and to a position as illustrated in FIG. 12.

The flapper member will move toward the vacuum nozzle 33 as long as the diaphragm member continues to move and the diaphragm member will continue to move as long as the vacuum in the chamber 24 is sufficient to overcome the bias of the springs 28 and 11 which resist movement of the diaphragm member. As the flapper member moves toward the vacuum nozzle 33, the vacuum in the vacuum chamber acting on the diaphragm member reduces and movement of the flapper member 32 toward the vacuum nozzle stops when the vacuum in the vacuum chamber substantially equals the force applied by the springs 11 and 28 to the diaphragm member, in which condition the diaphragm member is, in a sense, in an equilibrium state with the vacuum acting to move the diaphragm member in one direction and the springs acting to move the diaphragm member in the opposite direction. Since the force applied by the spring 11 to the diaphragm member will vary depending upon the speed at which the vehicle is driven by depression of the accelerator pedal, the position of the flapper member 32 for any given speed will vary, as noted hereinabove.

With the flapper member 32 in a position such as shown in FIG. 12, in the event that the vehicle speed decreases, the flapper member 32 will move with the core member 40 to the right, as described hereinabove, and away from the vacuum nozzle 33. This will cause a greater vacuum to be applied to the vacuum chamber 24 and cause the diaphragm member to move in a throttle increasing direction to thereby increase the speed of the vehicle. Due to the movement of the diaphragm member in this throttle increasing direction, the flapper member 32 moves toward the vacuum nozzle 33 because of the action of the feedback mechanism. The diaphragm member continues to move until it again achieves its equilibrium state as described hereinabove, and at this time, the flapper member will be in a position to maintain the vehicle at the desired or preset speed. In the event that it is desired to increase the vehicle speed above the preset or locked-in speed, the operator may depress the accelerator pedal to increase the vehicle speed above the desired speed due to the chain and one-way connection to the diaphragm and throttle members, respectively. As the vehicle speed increases, the flapper member 32 moves toward the nozzle 33 and the diaphragm member 25 moves outwardly or in a downward direction, as viewed in FIG. 1. When the operator removes his foot from the foot pedal and as a result the vehicle speed is decreased, the flapper member 32 will move away from the nozzle 33 due to movement of the core member to the right, as viewed in the drawings, and the diaphragm member will move in its speed increasing direction until it again achieves the equilibrium state discussed hereinabove.

As noted hereinabove, the diaphragm has a different position for maintaining the vehicle at each respective speed. At higher speeds, the diaphragm position is higher, as viewed in FIG. 1, requiring a greater amount of movement of the diaphragm member when the locking coil 51 is energized. This greater amount of movement is achieved by applying a greater vacuum in the vacuum chamber 24 as the speed increases. This greater vacuum is effected by providing for a greater amount of movement of the flapper member 32 when the coil 51 is initially energized. This is achieved by providing for a greater amount of movement of the link 52 and thereby a greater amount of movement of the flapper member.

The greater amount of movement of the link 52 to effect locking thereof at higher speeds is due to the fact that as the speed of the vehicle increases, the core member 40 moves away from the link 52 somewhat. This can be seen from viewing FIG. 13; as the vehicle speed increases, the retainers 80 and 90 pivot about a point near their attaching point to the housing. This causes the right end of the core 40 to lower to the position shown in FIG. 13, because the retainers 80 and 90 contact the core 40 to the right, as viewed in the drawings, of their fulcrum. Since the core 40 is lower, the link or armature 52 must move a greater distance to effect locking to the core 40, and as a result, the flapper 32 moves a greater distance from the nozzle 33, thus drawing more vacuum in the chamber 24 and moving the diaphragm a greater distance to a higher speed setting.

The above-described additional movement of the link or armature member 52 may be achieved by providing an inclined ramp 40a on the core 40 at a location where the right leg of the member 52 contacts the core 40, as shown in FIG. 15. As the core moves to the right, as viewed in FIG. 15, due to an increase in vehicle speed, the distance between the surface of the ramp and the right leg of the member 52 increases and thus at higher vehicle speeds, the member 52 must move a greater distance to effect locking thereof to the core member 40.

The speed governor unit 20 may be adjusted to maintain the vehicle at a speed higher than the first selected speed by energizing and de-energizing the locking coil 51 repetitively within a short period of time. By de-energizing the locking coil 51, the locking engagement between the core 40 and the flapper member 32 is broken and the upper portion of the flapper member 32, as viewed in FIG. 14, moves due to the bias of the spring 35 to the vacuum nozzle 33. However, the diaphragm 25 does not immediately go to the position of FIG. 1 so that the portion 135 of the flapper is positioned to the right in FIG. 14 of its closed throttle position because the feedback mechanism has not gone to its position when the diaphragm member 25 is in its unactuated position. Thus the flapper member 32 will be in a tilted position, as shown in FIG. 14 in solid lines. The dotted line position of the flapper shown in FIG. 14 is the normal position thereof. By again quickly energizing the locking coil 51 while the flapper member 32 is in the tilted position, the flapper member 32 is again locked to the core member 40. However, the relative position of the flapper and the core member has changed so that the set speed of the vehicle will now be higher than what was previously the set speed. In this manner, the governor unit 20 is capable of adjustment while the vehicle is operating and without increasing the speed of the vehicle to the desired speed manually. The amount of increase in the vehicle speed is indeterminable, but will be in the 1 to 8 m.p.h. range depending on the diaphragm position at the time of the above-described cycle. By holding coil 51 de-energized, the flapper will cover the nozzle 33, allowing the diaphragm to move to its closed throttle position, as described. Speed will then drop until coil 51 is again energized. This will be the new locked-in speed which is lower than the originally selected speed and, thus, the set-speed may also be adjusted to a lower speed.

Figure 9:
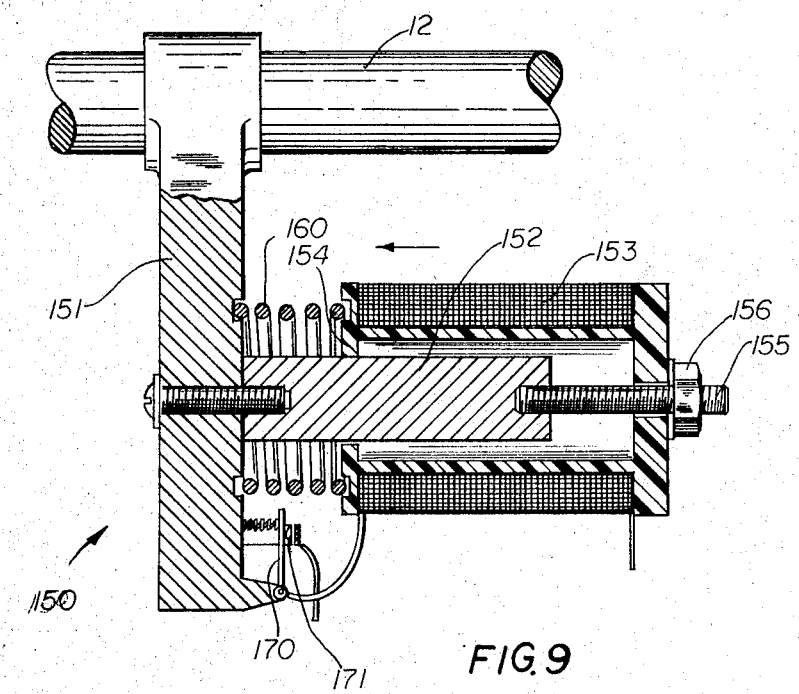
FIG. 9 is a sectional view of another portion of the speed governor mechanism shown in FIG. 1.

The speed governor mechanism preferably, and as illustrated in FIG. 1, includes a mechanism for providing a signal to the vehicle operator when the vehicle operator attempts to drive the vehicle at a speed in excess of the predetermined or desired set speed. The signal is in the form of a vibration or thumping on the accelerator pedal of the vehicle which is felt in the operator's foot. This signal mechanism is shown in FIG. 9 and is generally designated 150. The signal mechanism 150 includes a link member 151 connected with the rod 12. Secured to the link member 151 is a core member 152 of a solenoid, and the core member 152 projects into a solenoid coil 153. The solenoid coil 153 is slidably supported on the projection by means of a coil support 154 and a screw member 155. The screw member 155 has a suitable nut 156 thereon which functions as a stop member, as will be described hereinbelow. The coil 153 is biased outwardly of the core 152 by a suitable coil spring 160 which acts between the projection 151 and the coil 153 and biases the coil 153 into engagement with the nut 156. Upon energization of the coil 153, the coil 153 slides relative to the core 152 toward the projection 151 and strikes the projection 151 to provide a thump or vibration thereon which is transmitted to the rod 12 which transmits the vibration to the accelerator pedal 13 of the vehicle. This provides a vibration sensed by the operator's foot which is a signal that he has exceeded his desired set speed.

The coil 153 of the signal mechanism 150 is energized when the operator attempts to drive the vehicle above a set or predetermined speed. In the circuit for energizing the coil 153 are a pair of contacts 170, 171 which are biased to a closed position in engagement and are mounted adjacent the coil 153. When the coil 153 moves in the direction of the arrow in FIG. 9, it engages the movable contact 170 and breaks the circuit therethrough, de-energizing the coil 153, thus the coil returns to its position shown in FIG. 9. However, as will be clear from the circuit diagram to be described hereinbelow, the coil 153 is energized if the operator still attempts to drive the vehicle at the high speed and will again strike the link 151 and thereby provides a vibratory motion or signal to the accelerator pedal.

Figure 16:
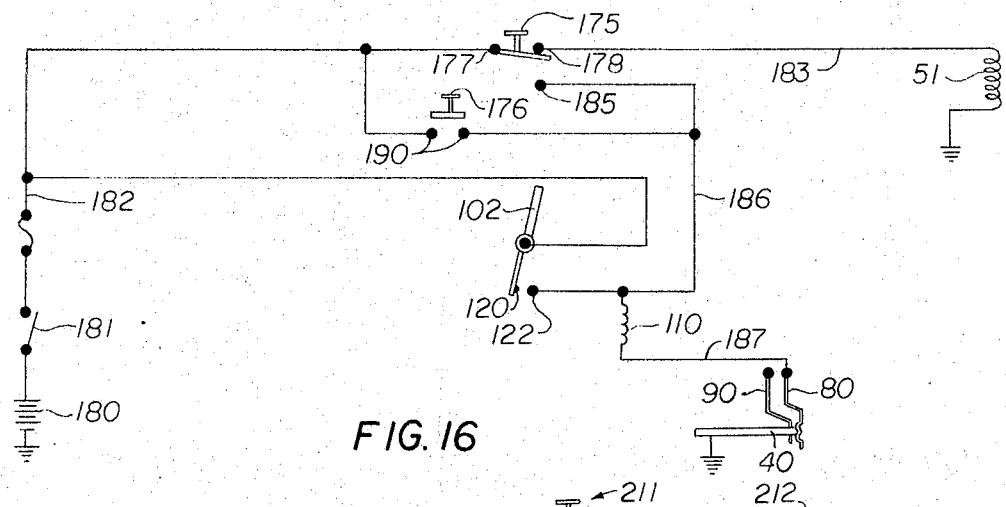
FIG. 16 is a schematic circuit diagram usable with the speed governor mechanism of FIG. 1.

The operation of the speed governor system illustrated in FIG. 1 will be more readily understood from a description of the electrical circuit which may be embodied therein and is illustrated in FIG. 16. The electrical circuit of FIG. 16 does not include the coil 153 for the signal mechanism, since this is an optional feature. The circuit is illustrated in FIG. 16 and includes two electrical switches, a speed set switch 175 and a speed resume switch 176, which may be mounted for operation by the vehicle operator, such as on the dashboard of the vehicle or on the turn signal indicator lever. The switches 175, 176 are shown as separate switches actuated by separate switch controls. However, the switches 175, 176 may be actuated by a single switch control. The electrical swtch 175 is biased to its normal position, illustrated in FIG. 16, connecting the contacts 177 and 178 thereof and the switch 176 is biased to its open position illustrated in FIG. 16 wherein it is in an open position.

The vehicle operator when he closes the ignition of the vehicle upon starting the vehicle, completes a circuit from the battery 180 through the ignition switch 181 through a conductor 182 and through the contacts 177 and 178 of the switch 175, the conductor 183, and the locking coil 51 of the speed governor unit 20. This immediately causes the core member 40 to be locked to the flapper member 32. However, it should be understood that the coil 110 for closing off the conduit 103 to the atmosphere has not, as yet, been energized, and therefore no speed control may take place.

If it is desired to activate the speed governor mechanism in order to maintain the vehicle at a predetermined speed, the operator must bring the vehicle up to the predetermined speed and when at that speed, depress the control button or switch 175. Depressing the switch 175 breaks the contacts 177, 178 thereof and de-energizes the locking coil 51. Depressing of the control button 175 also completes a circuit through the contacts 177, 185 thereof. This circuit is from the battery 180, ignition switch 181, conductor 182, contacts 177, 185, conductor 186, solenoid coil 110, conductor 187, and spring retainers 90 and 80, core 40, and conductor 188 to ground. Completion of this circuit energizes the coil 110 which moves the control member 102 to the position illustrated in FIG. 8 closing off the conduit 103 from the atmosphere. At the same time, the contacts 120 and 122 engage and complete a holding circuit from the conductor 182 through the contacts 120, 122 to maintain the solenoid 110 energized, even though the switch 175 is released, breaking the contacts 177, 185.

When the switch 175 is released, the contacts 177, 178 thereof are again closed and the circuit to the locking coil 51 is completed, thereby energizing the locking coil 51. The locking coil effects locking of the core 40 with the flapper 32 and then movement of the flapper 32 effects a change in the pressure in the chamber 24 and thereby controls the diaphragm member 25 so as to position the diaphragm member in accordance with the speed of the vehicle as described above.

As noted hereinabove, when the brake pedal of the automotive vehicle is actuated, the member 102 is moved away from the seal 130b and thereby causes communication of the conduit 103 with the atmosphere. This renders the speed governor unit 20 inoperative to maintain the vehicle at the predetermined speed. However, if after depressing the brake pedal rendering the speed governor mechanism inoperative, the control button 176 is depressed with the vehicle above the minimum speed to complete the circuit between member 80 and core 40, the speed governor is again energized to return the vehicle to the speed at which it was previously set.

Depression of the speed resume switch 176 completes a circuit from the conductor 182 through the contacts 190 thereof, conductor 186, coil 110, conductor 187, spring element 80, core 40 to ground when above minimum speed, thereby energizing the coil 110 and causing the control member 102 to move to its closed or sealed position, at which time the contacts 120 and 122 engage and establish a holding circuit for maintaining the coil 110 energized, as described hereinabove. Thus the vacuum governor is again rendered operative to maintain the speed of the vehicle at the predetermined or set speed.

Figure 17:
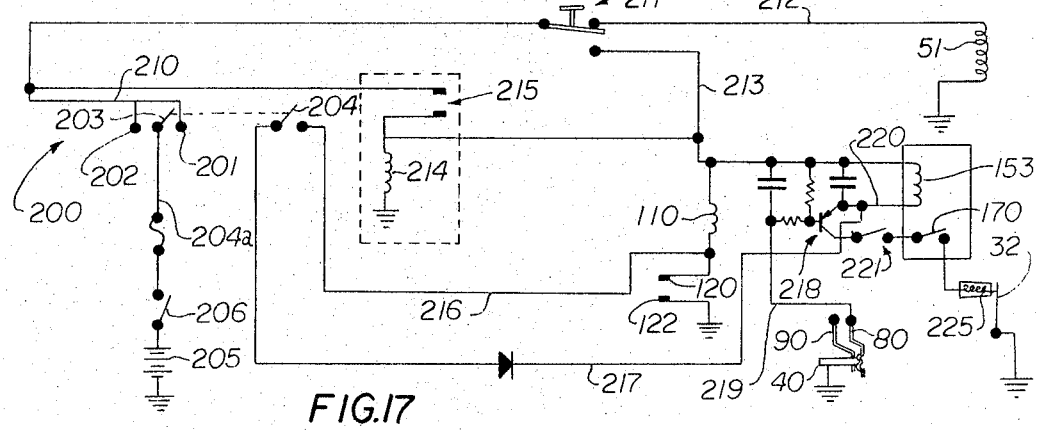
FIG. 17 is a modified circuit diagram capable of being utilized in the speed governor mechanism of FIG. 1.

The circuit diagram illustrated in FIG. 17 may be incorporated in the speed governor mechanism illustrated in FIG. 1 when the speed governor mechanism includes the signal mechanism 150 for signalling the operator. The circuit shown in FIG. 17 is similar to that shown in FIG. 16, however, the circuit of FIG. 17 permits the operation of the signalling mechanism even though the speed governor unit 20 is not actuated.

The circuit shown in FIG. 17 includes a selector switch 200 having contacts 201 and 202 which are adapted to be selectively connected by a switch member 203 to a conductor 204a. The conductor 204a is, in turn, connected with a battery 205 through a vehicle ignition switch 206. The switch member 203 is mechanically connected with a second switch member 204 and when the switch member 203 is in the position connecting the contact 201 with the conductor 204a, the switch member 204 is in a closed position closing its contacts, while when the switch member 203 is in the position connecting the conductor 204a with the contact 202, the switch member 204 is in a position wherein its contacts are open.

If it is desired to control the speed of the vehicle through the speed governor mechanism as well as to provide for a speed warning through the operation of the mechanism 150 whenever the vehicle reaches or exceeds a predetermined speed, the control switch 200 is moved to the position wherein the switch member 203 connects the contact 201 with the conductor 204a and the switch member 204 closes its contacts. Connection of the contact 201 with the conductor 204a completes the circuit from the battery 205 through the ignition switch 206, conductor 204a, switch 200, conductor 210, speed set switch 211, conductor 212, and locking coil 51. Then the speed governor is in a condition wherein the core member 40 is locked to the flapper member 32. The automotive vehicle is then brought up to the predetermined or set speed which is desired to be maintained, at which speed, the speed set switch 211 is moved to its position connecting the conductor 210 with the conductor 213. This breaks the circuit to the locking coil 51, as described hereinabove in connection with FIG. 16, and completes the circuit through the conductor 213 to a relay coil 214, which when energized causes the holding contacts 215 thereof to be closed maintaining the relay coil 214 energized.

The depressing of the speed set switch 211 also completes a circuit through the brake coil 110, conductor 216, now closed switch element 204, conductor 217, transistor 218, conductor 219, spring elements 80, 90, and core 40, thereby energizing the brake solenoid 110 and causing the control member 102 to move into sealing engagement blocking off the conduit 103. Current also flows from the conductor 213 through coil 153 and the transistor 218. This current is not sufficient to energize the coil 153 to effect movement thereof, while when combined with the current flowing through the coil 110 and transistor, energizes or turns the transistor on.

When the speed set switch 211 is released, the brake solenoid 110 is maintained energized by the completion of the circuit for holding it energized through the contacts 120, 122 and the holding contacts 215 for the relay 214. Upon release of the speed set switch 211, it returns to its normal position illustrated in FIG. 17 in full lines, completing a circuit for energizing the locking coil 51, thereby locking the core 40 the flapper 32 and thereby providing for the speed control operation, as described hereinabove in connection with FIG. 16.

In the event that the operator attempts to drive the vehicle at a speed in excess of the predetermined or set speed, the coil 153 of the signal mechanism 150 is energized by the circuit shown in FIG. 17. The energization of the coil 153 is accomplished by a circuit from the battery 205 through the ignition switch 206, conductor 204a, switch 200, conductor 210, holding contacts 215 of the relay coil 214, electrical coil 153, conductor 220, transistor 218, control switch 221, the contacts of which are closed when the operator's foot is depressing the accelerator pedal, now closed contacts 170, 171 of the signal mechanism 150, contact 225 located in the vacuum nozzle, and the flapper 32 connected to ground. The switch 221 is a conventional switch and the flapper 32 engages the contacts 225 when the vehicle reaches the preset speed. Energization of the coil 153, as described hereinabove, causes the coil 153 to move in the direction of the arrow, as shown in FIG. 9, and the vibratory signal is then applied to the accelerator pedal. As described above, the movement of the coil 153 breaks the contacts 170, 171, thus de-energizing the coil 153 and permits it to be returned to its normal position, as illustrated in FIG. 9, by the action of the biasing spring 160. However, in the event that the operator's foot is still on the accelerator pedal attempting to drive the vehicle at a speed in excess of the set speed, the circuit described hereinabove for energizing the coil 153 is completed upon return of the coil 153 to its normal position because the contacts 170, 171 again close. Closing of these contacts completes the circuit for energizing the coil 153 and the coil 153 is again energized. Thus the contacts 170, 171 constantly cause the coil 153 to be energized as long as the operator is attempting to drive the vehicle at a speed in excess of the predetermined speed, and the accelerator pedal is vibrated repetitively.

The circuit shown in FIG. 17 may operate to provide operation of the signal mechanism 150 without operation of the speed governor unit 20. To so operate, the switch element 203 is moved to its position wherein it connects the contact 202 with the conductor 204a. This completes a circuit from the battery 205 through ignition switch 206, conductor 204a, switch 200, conductor 210, speed set switch 211, conductor 212 to the locking coil 51. The vehicle may then be brought up to the speed and the control button 211 depressed. At this time, when the control button is depressed, a circuit is completed from the control button 211 through conductor 213, and relay coil 214, which closes the holding contacts 215 thereof for maintaining the coil 214 energized.

With the circuit in this condition, when the vehicle operator attempts to drive the vehicle at a speed in excess of the predetermined or set speed, a circuit is completed for energizing the coil 153. This circuit is through the holding contacts 215 of the coil 214, the coil 153 of the signal mechanism 150, conductor 220, transistor 218, now closed accelerator switch contacts 221, now closed contacts 170, 171 of the control mechanism 150, the contact 225 in the vacuum nozzle and the flapper 32 to ground. This, of course, energizes the coil 153 of the signal mechanism and causes the signal mechanism to be operated to provide the signal as discussed hereinabove, in connection with FIG. 16.

Figure 18:
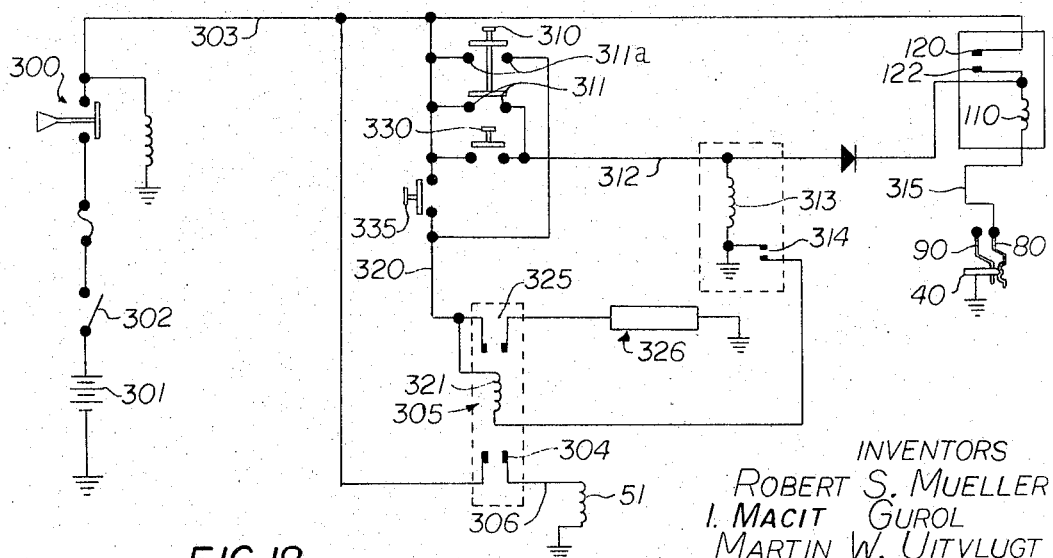
FIG. 18 is a still further modified circuit diagram illustrating an electrical circuit usable in conjunction with the speed governor mechanism of FIG. 1.

FIG. 18 illustrates a circuit diagram which may be used with the speed governor mechanism shown in FIG. 1 when a retarder is utilized in a vehicle. A retarder is a conventional structure for slowing a vehicle when going downhill, for example, without requiring actuation of the brakes or use of the brakes. The circuit diagram illustrated in FIG. 18 is similar in many respects with that illustrated in FIGS. 16, 17. When the operator enters the vehicle and starts the vehicle and desires to energize the speed governor mechanism, he closes a switch 300 closing the contacts thereof and completes the circuit from the battery 301 through ignition switch 302, the contacts of the switch 300, conductor 303, and normally closed contacts 304 of a relay 305, conductor 306 and the locking coil 51, thereby locking the core 40 to the flapper 32. However, at this time, the brake solenoid coil 110 has not been energized and, therefore, control of the vehicle is not attained through the speed governor mechanism. If it is desired to energize the speed governor mechanism, a circuit is completed by depressing the speed set switch 310 which is mounted adjacent the steering wheel of the vehicle.

By depressing the speed set switch 310, a circuit is completed through the contacts 311 thereof, conductor 312 and relay coil 313. When relay coil 313 is energized, the holding contacts 314 thereof close. At the same time, a circuit is completed from the conductor 312 through the coil 110, thereby closing the contacts 120, 122 which maintain the solenoid coil 110 energized, through the conductor 315, core and spring retainers 90, 80 and the core 40 to ground. This, of course, energizes the solenoid 110 and closes off the chamber 24 from the atmosphere. Closing of the switch 310 also completes a circuit from the conductor 303 through contacts 311a of the switch 310, conductor 320, coil 321 of relay 305, holding contacts 314 for the relay 313 to ground. Energization of the coil 321 causes the normally closed contacts 304 to open, de-energizing the coil 51 and also causes normally closed contacts 325 in circuit with the retarder mechanism 326 to open, rendering the retarder mechanism inoperative.

Release of the speed governor control button 310 causes the de-energization of the coil 321 and closing of the contacts 304 and 325 thereof. Closing of the contacts 325 performs no function since they are connected with the contacts 311a of the switch 310 which are now open, while closing of the contacts 304 again energizes the locking coil 51 and renders the speed governor mechanism operative, as described hereinabove. The relay coil 313 is also de-energized on opening of the contacts 311.

As noted hereinabove, when the brake pedal is actuated, the contacts 120, 122 are broken de-energizing the coil 110 and causing the speed governor mechanism to be rendered inoperative. In the event, however, that it is desired to resume the control of the speed of the vehicle by the speed governor mechanism, the resume speed switch 330 may be depressed, closing the contacts thereof and causing a circuit to be completed from the conductor 303 through the resume control switch 330, conductor 312, and coil 110, conductor 315, the spring and core retainers 80, 90 and core 40. This, of course, again closes the chamber 24 from communication with the atmosphere and renders the speed governor mechanism operative to control the speed of the vehicle.

If it is desired to use the retarder mechanism for retarding the speed of the vehicle, which mechanisms are conventional, it is necessary only to close the retarder control switch 335 which completes the circuit from the conductor 303 through the switch 335, conductor 320, through the normally closed contacts 325 of the relay 305, and through the retarder 326, thereby energizing the retarder.

From the above description, it should be readily apparent that the speed governor mechanism and modifications thereof embodying the present invention have been described in considerable detail and that certain changes, modifications, and adaptations may be made therein by those skilled in the art to which it relates, and it is hereby intended to cover all such changes, modifications, and adaptations which come within the scope of the appended claims.

Having described our invention, we claim:

1. A mechanism for moving a control member movable in opposite directions to effect a control operation comprising an actuating member movable in one direction to effect movement of the control member in one direction, vacuum chamber means on one side of said actuating member, valve means for providing a vacuum in said vacuum chamber to effect movement of said actuating member in said one direction including a valve member associated with a vacuum conduit means and movable from a first position in one direction relative to the vacuum conduit means to progressively increase the degree of vacuum in the vacuum chamber, and a member movable in opposite directions in response to the sensing of a change in the condition controlled by said control member, and means for selectively locking said control member to said valve member when said valve member is in said first position so that said valve member moves in its said one direction when said member moves in one of its directions.

2. A mechanism for moving an engine throttle member movable in opposite directions between closed and open positions to control engine speed comprising an actuating member movable in one direction to effect movement of the throttle member in a throttle opening direction, vacuum chamber means on one side of said actuating member, valve means for providing a vacuum in said vacuum chamber to effect movement of said actuating member in said one direction including a valve member associated with a vacuum conduit and movable from a first position relative to the vacuum conduit to progressively increase communication between the vacuum chamber and the vacuum conduit, a member movable in one direction on an increase in engine speed and in a second direction opposite to the first direction on a decrease in engine speed, and means for selectively locking said member to said valve member when said valve member is in its first position and said engine is at a desired speed above a predetermined minimum speed whereby as engine speed tends to decrease from said desired speed with said member moving in said second direction said valve member moves from said first position and said throttle moves in a throttle opening direction to maintain said engine speed at substantially the desired speed.

3. A mechanism as defined in claim 2 further including a feedback means operating between said actuating member and said valve member and operable to move the valve member toward its said first position as said actuating member moves in its throttle opening direction.

4. A mechanism for moving a vehicle throttle member movable in opposite directions between closed and open positions to control vehicle speed comprising a diaphragm member movable in one direction to effect movement of the throttle member in a throttle opening direction, vacuum chamber means on one side of said diaphragm member, valve means for providing a vacuum in said vacuum chamber to effect movement of said diaphragm member in said one direction including a valve member associated with a vacuum conduit and movable from a first position relative to the vacuum conduit to progressively increase communication between the vacuum chamber and the vacuum conduit, a member movable in one direction on an increase in vehicle speed and in a second direction opposite to the first direction on a decrease in vehicle speed, means for selectively locking said member to said valve member when said valve member is in its said first position and said vehicle is at a desired speed above a predetermined minimum speed whereby as the vehicle speed tends to decrease from the desired speed with said member moving in said second direction, said valve member moves in said one direction to create a vacuum in a vacuum chamber and effect movement of said throttle in a throttle opening direction to maintain said vehicle speed at substantially said desired speed, and means for releasing the vacuum in said vacuum chamber upon depression of the brake pedal of the vehicle.

5. A mechanism as defined in claim 4 further including a feedback means operating between said diaphragm member and said valve member and operable to move the valve member toward its first position as said diaphragm member moves in its throttle opening direction.

6. A mechanism for moving an engine throttle member movable in opposite directions between closed and open positions to control engine speed comprising an actuating member movable in one direction to effect movement of the throttle member in a throttle opening direction, vacuum chamber means on one side of said actuating member, valve means for providing a vacuum in said vacuum chamber to effect movement of said actuating member in said one direction including a valve member associated with a vacuum conduit and movable from a first position relative to the vacuum conduit to progressively increase communication between the vacuum chamber and the vacuum conduit, a member movable in one direction on an increase in engine speed and in a second direction opposite to the first direction on a decrease in engine speed, means for selectively locking said member to said valve member when said valve member is in its said first position and said engine is at a desired speed above a predetermined minimum speed whereby as engine speed tends to decrease from said desired speed with said member moving in said second direction said valve member moves from said first position and said throttle member moves in a throttle opening direction to maintain said engine speed at substantially the desired speed, feedback means operating between said actuating member and said valve member and operable to move the valve member toward its said first position as said actuating member moves in its throttle opening direction, and means for signalling the engine operator when the engine speed is increased above the desired speed by manual actuation of the throttle member in a speed increasing direction.

7. A mechanism for moving a vehicle throttle member movable in opposite directions between closed and open positions to control vehicle speed comprising a diaphragm member movable in one direction to effect movement of the throttle member in a throttle opening direction, vacuum chamber means on one side of said diaphragm member, valve means for providing a vacuum in said vacuum chamber to effect movement of said diaphragm member in said one direction including a valve member associated with a vacuum conduit and movable from a first position relative to the vacuum conduit to progressively increase communication between the vacuum chamber and the vacuum conduit, a member movable in one direction on an increase in vehicle speed and in a second direction opposite to the first direction on a decrease in vehicle speed, means for selectively locking said member to said valve member when said valve member is in its said first position and said vehicle is at a desired speed above a predetermined minimum speed whereby as vehicle speed tends to decrease from said desired speed with said member moving in said second direction, said valve member moves from said first position and said throttle member moves in a throttle opening direction to maintain said vehicle speed at substantially the desired speed, feedback means operating between said diaphragm member and said valve member and operable to move the valve member toward its said first position as said diaphragm member moves in its throttle opening direction, means for releasing the vacuum in said vacuum chamber upon the application of the vehicle brake, and means for providing a signal to the operator when the operator actuates the accelerator pedal of the vehicle to drive the vehicle at a speed in excess of said given speed.

8. A mechanism as defined in claim 7 wherein said means for locking said member to said valve member comprises a coil encircling said member with said member forming the core thereof, a link member pivotal relative to said valve member upon energization of said coil and having leg portions which engage said core at portions thereof adjacent the opposite ends of said coil and which is pivotal to effect locking of said core to said valve member upon energization of said coil.

9. A mechanism as defined in claim 7 wherein said means for releasing the vacuum comprises a control member having a position in sealing engagement with a conduit leading to the vacuum chamber and blocking communication of the conduit with the atmosphere and a second position providing for communication of the conduit with the atmosphere and is movable to its second position upon depressing of the vehicle brake pedal.

10. A mechanism as defined in claim 9 wherein said control member is moved into sealing engagement with said conduit upon energization of a solenoid coil associated therewith and said control member when in sealing engagement carries an electrical contact engageable with a fixed electrical contact forming a holding circuit for holding the coil energized.

11. A mechanism as defined in claim 7 wherein said means for providing a signal includes a signal mechanism for vibrating the accelerator pedal of the vehicle and includes a coil slidable relative to the core thereof and movable to engage a member connected to the linkage actuated by the accelerator pedal to effect vibration of the linkage.

12. A mechanism for moving a control member in opposite directions to effect a control operation comprising spring means biasing the control member to a first position, an actuating member movable in a given direction to effect movement of the control member against the bias of said spring means in one direction, vacuum chamber means on one side of said actuating member, valve means for providing a vacuum in said vacuum chamber to effect movement of said actuating member in said given direction including a valve member associated with a vacuum conduit and movable in one direction relative to the vacuum conduit to progressively increase communication between the vacuum chamber and the vacuum conduit, and a member movable in opposite directions in response to the sensing of a change in the condition controlled by said control member, and means for selectively locking said member to said valve member so that said valve member moves in its said one direction when said member moves in one of its directions.

13. A mechanism for moving an engine throttle member in opposite directions between closed and open positions to control engine speed comprising spring means biasing said throttle member for movement in a throttle closing direction, an actuating member movable in one direction to effect movement of the throttle member in a throttle opening direction against the bias of said spring means, vacuum chamber means on one side of said diaphragm member, valve means for providing a vacuum in said vacuum chamber to effect movement of said actuating member in said one direction including a valve member associated with a vacuum conduit and movable from a first position relative to the vacuum conduit to progressively increase communication between the vacuum chamber and the vacuum conduit, a member movable in one direction on an increase in engine speed and in a second direction opposite to the first direction on a decrease in engine speed, and means for moving said valve member from its said first position when said engine is at a desired speed above a predetermined minimum speed with said spring means applying a predetermined force tending to move said throttle member in its throttle closing direction to apply a vacuum in said vacuum chamber which applies a force on said throttle member substantially equal to said spring force and for locking said valve member to said member for movement therewith whereby a decrease in engine speed from said desired speed results in said member moving in said second direction and said valve member moving therewith and said throttle member moving in a throttle opening direction to maintain said engine speed at substantially the desired speed.

14. A mechanism for moving a vehicle throttle member movable in opposite directions between closed and open positions to control vehicle speed comprising spring means biasing said throttle member for movement in a throttle closing direction, a diaphragm member movable in one direction to effect movement of the throttle member in a throttle opening direction against the bias of said spring means, vacuum chamber means on one side of said diaphragm member, valve means for providing a vacuum in said vacuum chamber to effect movement of said diaphragm member in said one direction including a valve member associated with a vacuum conduit and movable from a first position relative to the vacuum conduit to progressively increase communication between the vacuum chamber and the vacuum conduit with the extent of movement of the valve member determining the amount of vacuum applied, a member movable in one direction on an increase in vehicle speed and in a second direction opposite to the first direction on a decrease in vehicle speed, means for moving said valve member a different distance from its said first position depending upon the speed of the vehicle when above a minimum speed to apply a given vacuum in said vacuum chamber sufficient to apply a force to said throttle member equal to the force applied by said spring means at the particular speed and locking said valve member to said member when said vehicle is above a predetermined speed whereby a decrease in vehicle speed results in said member moving in said second direction and said valve member therewith to create a vacuum in the vacuum chamber and effect movement of said throttle in a throttle opening direction.

15. A mechanism as defined in claim 14 wherein said means for moving said valve member comprises a link member associated with said valve member to effect movement thereof upon movement of the link member, and an electrical coil energizable to effect movement of the link member.

16. A mechanism as defined in claim 14 wherein the variable movement of the valve member depending upon vehicle speed is provided by means providing for variable movement of said link member.

17. A mechanism as defined in claim 16 wherein said link member comprises a part movable to engage said member when said electrical coil is energized and including means for supporting said member to provide for movement of said member away from said part as the vehicle speed increases.

18. A mechanism as defined in claim 17 wherein said means supporting said member comprises spring means supporting one end thereof and yieldable in response to an increase in vehicle speed.

19. A mechanism as defined in claim 16 wherein said member includes an inclined ramp portion which cooperates with a part of said link member and which moves relative thereto upon an increase in vehicle speed.

20. A mechanism as defined in claim 15 wherein said valve member includes a fulcrum which engages a portion of said link member and a flexible band member cooperates with said valve member and link member and acts between said link member and valve member on one side of said fulcrum.

21. A mechanism as defined in claim 14 further including a feedback means including a feedback member movable upon movement of said diaphragm member and operable to move said valve member toward its said first position as said diaphragm member moves in its said one direction.

22. A mechanism for moving a vehicle throttle member movable in opposite directions to control vehicle speed comprising an actuating member movable in one direction to effect movement of the throttle member in a first direction to increase vehicle speed, vacuum chamber means on one side of said actuating member, valve means for providing a vacuum in said vacuum chamber to effect movement of said actuating member in said one direction including a valve member movable to control the degree of vacuum in said vacuum chamber, a speed sensing member movable in response to a change in speed of the vehicle and operatively associated with said valve member to effect movement of said valve member upon movement of said speed sensing member, and feedback means including a feedback member movable upon movement of said actuating member and operable to move said valve member to decrease the degree of vacuum in said chamber as said actuating member moves in its said one direction.

23. A mechanism for moving a vehicle throttle member movable in opposite directions between closed and open positions to control vehicle speed comprising a diaphragm member movable in one direction to effect movement of the throttle member in a throttle opening direction, vacuum chamber means on one side of said diaphragm member, valve means for providing a vacuum in said vacuum chamber to effect movement of said diaphragm member in said one direction including a valve member associated with a vacuum conduit and movable from a first position relative to the vacuum conduit to progressively increase communication between the vacuum chamber and the vacuum conduit, a speed sensing member movable in one direction on an increase in vehicle speed and in a second direction opposite to the first direction on a decrease in vehicle speed, means for selectively locking said speed sensing member to said valve member when said vehicle is at a given speed above a predetermined minimum speed to lock said speed sensing member and said valve member in a relationship to hold existing vehicle speed whereby movement of said speed sensing member in said second direction effects movement of said valve member from its first position providing greater communication between the vacuum conduit and the vacuum chamber thereby effecting movement of the diaphragm member in its throttle opening direction.

24. A mechanism for moving a vehicle throttle member movable in opposite directions between closed and open positions to control vehicle speed comprising a diaphragm member movable in one direction to effect movement of the throttle member in a throttle opening direction, vacuum chamber means on one side of said diaphragm member, valve means for providing a vacuum in said vacuum chamber to effect movement of said diaphragm member in said one direction including a valve member associated with a vacuum conduit and movable from a first position relative to the vacuum conduit to progressively increase communication between the vacuum chamber and the vacuum conduit, a speed sensing member movable in one direction on an increase in vehicle speed and in a second direction opposite to the first direction on a decrease in vehicle speed, means for selectively locking said speed sensing member to said valve member when said vehicle is at a given speed above a predetermined minimum speed to lock said speed sensing member and said valve member in a relationship to hold existing vehicle speed whereby movement of said speed sensing member in said one direction effects movement of said valve member from its first position providing greater communication between the vacuum conduit and the vacuum chamber thereby effecting movement of the diaphragm member in its throttle opening direction, said locking means including means operable to vary the relative position of said speed sensing member and said valve member thereby varying the speed of the vehicle at which said valve member will return to its said first position.

25. A mechanism as defined in claim 24 wherein said locking means comprises an electrical coil energizable to effect locking of the valve member to the speed sensing member and said means for adjusting the relative positions of the valve member and speed sensing member includes a control switch movable to de-energize said electrical coil while said vehicle is moving and again energize the electrical coil to lock the speed sensing member and the valve member in a new relationship.

26. A mechanism as defined in claim 25 wherein said valve member is biased by a spring means to its first position and to which said spring means moves a portion of the valve member when said coil is de-energized and wherein a feedback member holds an end portion of the valve member from its first position until the vacuum in said chamber is relieved thereby providing for pivoting of the valve member upon deenergization of said electrical coil.

27. A mechanism for effecting movement of a vehicle throttle member in opposite directions between closed and open positions to control the vehicle speed comprising a diaphragm member movable in one direction to effect movement of the throttle member in a throttle opening direction, vacuum chamber means on one side of said diaphragm member, a valve member movable to control the degree of vacuum in the vacuum chamber, said diaphragm member defining a portion of said vacuum chamber and movable when a vacuum is established therein, a speed sensing member movable in response to a change in speed of the vehicle, and means for moving said valve member from its first position inhibiting the establishment of a vacuum in said vacuum chamber to establish a vacuum in said chamber to hold said throttle member in a position depending on vehicle speed and operable to lock said valve member to said speed sensing member to thereby vary the position of said valve member in accordance with speed changes of the vehicle.

28. A mechanism as defined in claim 27 wherein said speed sensing member extends through an opening in said valve member and is movable relative to said valve member in said opening in the speed increasing direction when said valve member is in its said first position and said locking means is de-energized.

29. A mechanism as defined in claim 27 wherein said means for moving said valve member comprises an electrical coil and said speed sensing member forms the core thereof, with one end of the speed sensing member being engageable with a spring element acting against weights movable in response to changes in vehicle speed and which overcomes the bias by said weights at a predetermined speed to effect separation of said core member and said spring element.

30. A mechanism as defined in claim 29 wherein said core and spring element comprise a portion of the circuit for energizing said electrical coil and when separated break the circuit and thereby prevent energization of the electrical coil at a speed below that at which the spring element overcomes the bias by said weights.

31. A mechanism as defined in claim 29 wherein said weights have arm portions which engage in notches in a drive coupling member and said drive coupling member has a portion cooperable with and rotatable relative to said spring element.

32. A mechanism for moving a vehicle throttle member in opposite directions between closed and open positions to control vehicle speed comprising a member connected with the accelerator pedal of the vehicle and movable in a first direction upon actuation of the accelerator pedal of the vehicle to increase vehicle speed, an electric coil adjacent said member and energizable in response to said vehicle reaching a predetermined speed, said coil having a first position and being slidably supported for movement relative to said member and movable when energized to strike said member which results in a vibration of the accelerator pedal of the vehicle.

33. A mechanism as defined in claim 32 wherein said electric coil is energized upon completion of a circuit including normally closed contacts mounted adjacent to said coil and which open in response to movement of said coil and said coil is biased to its said normal position by biasing means and said contacts being closed when said coil is in its said normal position.

34. A mechanism as defined in claim 32 wherein said mechanism includes a valve member movable from a first position in one direction in response to a decrease in vehicle speed and operable to complete a circuit for energizing said electric coil upon return to said first position when said accelerator pedal is actuated.

35. A mechanism as defined in claim 32 wherein said valve member moves relative to a vacuum nozzle and said vacuum nozzle carries an electrical contact engaged by said valve member when in its said first position to complete a circuit for energizing said electrical coil.

36. A mechanism for effecting movement of a vehicle throttle member in opposite directions between closed and open positions to control the vehicle speed comprising a diaphragm member movable in one direction to effect movement of the throttle member in a throttle opening direction, vacuum chamber means on one side of said diaphragm member, a valve member movable to control the degree of vacuum in the vacuum chamber, said diaphragm member defining a portion of said vacuum chamber and movable when a vacuum is established therein, a speed sensing member movable in response to a change in speed of the vehicle, means for locking said speed sensing member to said valve member so that upon movement of said speed sensing member upon a decrease in vehicle speed movement of the valve member is effected to establish an increase in vacuum in said vacuum chamber and including an electrical coil energizable to effect locking of said speed sensing member to said valve member.

37. A mechanism as defined in claim 36 wherein said electrical coil is energized through a speed set control switch mounted so as to be energized by the operator of the vehicle.

38. A mechanism as defined in claim 36 having means for venting said vacuum chamber upon depression of the brake pedal of the vehicle and electrical coil means energizable to block said venting means and operatively connected with said speed set control switch and energizable upon actuation thereof and a speed resume switch connected with said electrical coil for closing said venting means upon actuation thereof.

39. A mechanism as defined in claim 36 further including a signalling electrical coil energizable to provide a signal on the accelerator pedal when the speed of the vehicle exceeds the preset speed by depression of the accelerator pedal of the vehicle.

40. A mechanism as defined in claim 36 further including a retarder mechanism for retarding the speed of the automotive vehicle upon energization thereof and energized upon actuation of a switch mechanism mounted so as to be actuated by the operator of the vehicle.

41. A mechanism for effecting movement of a vehicle throttle member in opposite directions between closed and open positions to control the vehicle speed comprising a diaphragm member movable in one direction to effect movement of the throttle member in a throttle opening direction, vacuum chamber means on one side of said diaphragm member, means operable to control the degree of vacuum in said vacuum chamber and to vary the degree of vacuum in said vacuum chamber in response to a condition indicating vehicle speed to maintain vehicle speed substantially constant at a desired speed and including an electrical coil energizable at said desired speed.

42. A mechanism for effecting movement of a vehicle throttle member in opposite directions between closed and open positions to control the vehicle speed comprising a diaphragm member movable in one direction to effect movement of the throttle member in a throttle opening direction, vacuum chamber means on one side of said diaphragm member, means operable to control the degree of vacuum in said vacuum chamber and to vary the degree of vacuum in said vacuum chamber in response to a condition indicating vehicle speed to maintain the vehicle speed substantially constant at a desired speed including an electrical coil energizable at said desired speed and located in a circuit including a speed set control switch mounted so as to be energized by the operator of the vehicle.

43. A mechanism as defined in claim 42 wherein said speed set control switch may be actuated so as to de-energize said electrical coil and to immediately thereafter re-energize the electrical coil so as to vary the desired speed.

44. A mechanism as defined in claim 42 having means for venting the vacuum chamber upon depression of the brake pedal of the vehicle and electrical coil means energizable to block said venting means and operatively connected with said speed set control switch and energizable upon depression thereof, and a speed resume switch connected with said electrical coil for closing said venting means upon actuation thereof.

45. A mechanism as defined in claim 44 wherein said speed set switch and speed resume switch are in circuit with the ignition switch of the automotive vehicle so that said electrical coil means may be energized only when the vehicle is operating.

46. A mechanism for effecting movement of a vehicle throttle member in opposite directions between closed and open positions to control the vehicle speed comprising a diaphragm member movable in one direction to effect movement of the throttle member in a throttle opening direction, vacuum chamber means on one side of said diaphragm member, means operable to control the degree of vacuum in said vacuum chamber and to vary the degree of vacuum in said vacuum chamber in response to a condition indicating vehicle speed to maintain the vehicle speed substantially constant and including a first electrical coil energizable at said desired speed, and means for providing a signal to the operator of the vehicle when said vehicle reaches a predetermined speed and including a second electrical coil energized when the vehicle exceeds said predetermined speed.

47. A mechanism as defined in claim 46 wherein said first and second electrical coils are in a control circuit and said second electrical coil may be energized independently of said first electrical coil.

48. A mechanism as defined in claim 47 wherein said second electrical coil is energized when said vehicle reaches said predetermined speed and is in a circuit including a transistor element which is turned on by actuation of a control switch which is actuated at said predetermined speed.

49. A mechanism as defined in claim 46 further including means for venting said vacuum chamber upon actuation of the brake pedal of the vehicle and a third electrical coil energizable to block said venting means.

50. A mechanism for moving a control member in opposite directions to effect a control operation comprising spring means biasing the control member to a first position, an actuating member movable in a given direction to effect movement of the control member against the bias of said spring means in one direction, vacuum chamber means on one side of said actuating member, valve means for providing a vacuum in said vacuum chamber to effect movement of said actuating member in said one direction including a valve member associated with a vacuum conduit and movable in one direction relative to the vacuum conduit to progressively increase communication between the vacuum chamber and the vacuum conduit, a member movable in opposite directions in response to the sensing of a change in the condition controlled by said control member, and means interconnecting said member and said valve member so that said valve member moves in its said one direction when said member moves in one of its directions.

51. A mechanism for effecting movement of a vehicle throttle member in opposite directions between closed and open positions to control the vehicle speed comprising a diaphragm member movable in one direction to effect movement of the throttle member in a throttle opening direction, vacuum chamber means on one side of said diaphragm member, a valve member movable to control the degree of vacuum in the vacuum chamber, said diaphragm member defining a portion of said vacuum chamber and movable when a vacuum is established therein, a speed sensing member movable in response to a change in speed of the vehicle, and means for moving said valve member from its first position inhibiting the establishment of a vacuum in said vacuum chamber to establish a vacuum in said chamber to hold said throttle member in a position depending on desired vehicle speed and operable to provide for movement of said valve member in accordance with changes in the vehicle from said desired speed.

52. A mechanism for effecting movement of a vehicle throttle member in opposite directions between closed and open positions to maintain a desired vehicle speed comprising a diaphragm member movable in one direction to effect movement of the throttle member in a throttle opening direction, vacuum chamber means on one side of said diaphragm member, a valve member movable to control the degree of vacuum in the vacuum chamber, said diaphragm member defining a portion of said vacuum chamber and movable when a vacuum is established therein, a speed sensing member movable in response to a change in speed of the vehicle, and means interconnecting and associated with said speed sensing member and said valve member so that upon movement of said speed sensing member upon a decrease in vehicle speed from said desired speed movement of the valve member is effected to establish an increase in vacuum in said vacuum chamber and including an electrical coil energizable to provide for said movement of said valve member upon a decrease in vehicle speed from said desired speed.

53. A mechanism for effecting movement of a control member comprising an actuating member movable to effect movement of the control member, vacuum chamber means on one side of said actuating member, means operable to control the degree of vacuum in said vacuum chamber including a first electrical coil energizable to establish a vacuum therein, a control switch means in circuit with said coil and having first contacts normally closed to effect energization of said first electrical coil, means for venting said vacuum chamber, a second electrical coil energizable to block said venting means, said second electrical coil being connected with said switch means and being normally deenergized and said switch means having second contacts connected with said second electrical coil, and means for opening said first contacts and closing said second contacts and then again closing said first contacts whereby said first coil is deenergized and then again energized after energization of said second coil.

54. A mechanism as defined in claim 53 further including a holding circuit for holding said second coil energized even though said second contacts open after closing thereof.

55. A mechanism as described in claim 42 wherein said speed set control switch is mounted on the vehicle turn signal lever.

56. A mechanism as described in claim 44 wherein said speed set control switch and said speed resume switch are mounted on the vehicle turn signal lever.

57. A mechanism for moving a vehicle throttle control member movable in opposite directions between closed and open positions to control vehicle speed comprising a diaphragm member movable in one direction to effect movement of the throttle member in a throttle opening direction, vacuum chamber means on one side of said diaphragm member, valve means for providing a vacuum in said vacuum chamber to effect movement of said diaphragm member in said one direction including a valve member associated with a vacuum conduit and movable from a first position relative thereto to progressively increase communication between the vacuum chamber and the vacuum conduit, and feedback means including a feedback member movable with said diaphragm member upon movement in said throttle opening direction and operable to move said valve member toward its first position as said diaphragm member moves in its said throttle opening direction, said feedback member being supported for movement upon movement of said diaphragm member and including a cam portion engageable with a portion of said valve member to move said valve member toward its said first position in response to movement of said cam portion occurring when said diaphragm member moves in its throttle opening direction, said feedback member further being supported for pivotal movement and comprising a wirelike member having a portion biased into engagement with the diaphragm member and a portion pivotal about a pin member, and said cam portion comprising a portion extending through an opening in said valve member.

58. A mechanism for effecting movement of a vehicle throttle member to control vehicle speed comprising an actuating member movable in one direction to effect movement of the throttle member in a throttle opening direction, vacuum chamber means on one side of said actuating member, said actuating member being movable in said one direction upon creation of a vacuum of a predetermined degree in said vacuum chamber, a valve member movable to control the degree of vacuum in said vacuum chamber, a speed sensing member movable in response to a change in speed of the vehicle, and means for selectively locking said speed sensing member to said valve member so that said valve member moves in one direction when said member moves in a corresponding direction.

59. A mechanism for effecting movement of a vehicle throttle member as defined in claim 58 further including means responsive to depression of the brake pedal of the vehicle for effecting a reduction of the vacuum in said vacuum chamber.

60. A mechanism for effecting movement of a vehicle throttle member as defined in claim 58 wherein said locking means comprises electrical coil means operable to effect adjustment of the relation position of said valve member and said speed sensing member.

61. A mechanism for effecting movement of a vehicle throttle member as defined in claim 60 further including a control switch movable to operate said electrical coil means while said vehicle is moving to lock said speed sensing member and valve member in a new relationship.

62. A mechanism for effecting movement of a vehicle throttle member as defined in claim 58 wherein said locking means when actuated is operable to move said valve member relative to said speed sensing member to create a vacuum in said vacuum chamber of a predetermined degree.

References Cited by the Examiner

UNITED STATES PATENTS

| 2,642,166 | 6/1953 | Strauss | 192—3 |
| 3,127,966 | 4/1964 | Sheriff et al. | 192—3 |
| 3,243,022 | 3/1966 | Humphrey | 192—3 |

MARK NEWMAN, *Primary Examiner.*

ARTHUR T. McKEON, *Examiner.*